(12) United States Patent
Matheny et al.

(10) Patent No.: US 7,780,419 B1
(45) Date of Patent: Aug. 24, 2010

(54) REPLACEABLE LEADING EDGE INSERT FOR AN IBR

(75) Inventors: Alfred P. Matheny, Jupiter, FL (US); Edwin L. Kite, Stuart, FL (US)

(73) Assignee: Florida Turbine Technologies, Inc., Jupiter, FL (US)

( * ) Notice: Subject to any disclaimer, the term of this patent is extended or adjusted under 35 U.S.C. 154(b) by 797 days.

(21) Appl. No.: 11/715,044

(22) Filed: Mar. 6, 2007

(51) Int. Cl.
*F01D 5/30* (2006.01)

(52) U.S. Cl. ............................ 416/221; 416/224

(58) Field of Classification Search ............ 416/62, 416/220 R, 221, 224, 228, 236 R, 241 R
See application file for complete search history.

(56) References Cited

U.S. PATENT DOCUMENTS

| | | | |
|---|---|---|---|
| 2,651,494 A | 9/1953 | Persson | |
| 2,974,924 A * | 3/1961 | Rankin et al. | 415/173.7 |
| 3,275,295 A | 9/1966 | Caldwell et al | |
| 4,326,833 A * | 4/1982 | Zelahy et al. | 416/96 R |
| 4,342,542 A | 8/1982 | Tan et al. | |
| 4,712,980 A | 12/1987 | Gely et al. | |
| 4,738,594 A * | 4/1988 | Sato et al. | 416/224 |
| 4,795,313 A | 1/1989 | Coulon | |
| 4,817,455 A | 4/1989 | Buxe | |
| 5,129,786 A | 7/1992 | Gustafson | |
| 5,601,407 A | 2/1997 | Humhauser | |
| 5,785,498 A | 7/1998 | Quinn et al. | |
| 6,471,485 B1 | 10/2002 | Rossmann et al. | |
| 6,620,308 B2 * | 9/2003 | Gilbert | 205/702 |
| 7,399,159 B2 * | 7/2008 | Matheny et al. | 416/62 |

* cited by examiner

*Primary Examiner*—Edward Look
*Assistant Examiner*—Ryan H Ellis
(74) *Attorney, Agent, or Firm*—John Ryznic

(57) ABSTRACT

A compressor blade for a gas turbine engine that includes a composite leading edge insert attached to a titanium blade by a row of fastener pins along an aft edge of the insert to prevent unzipping. Each insert is also secured by an electrochemically disbondable composition for easy removable of a damaged insert from an integrally bladed disk. One or more of the fastener pins provides for an electrical conductive path that bypasses the disbondable composition during a lightening strike so that the insert does not release. Each replaceable insert includes a root portion that fits within a slot of the rotor disk, with each insert being secured against radial displacement by two shear pins secured within two shear pin slots formed in both the insert root portion and the rotor disk slot. The shear pin slots are curved and follow the curvature of the airfoil at the junction to the rotor disk. A retaining and balancing ring is secured within an annular groove and functions to retain the shear pins within the slots and to balance the rotor disk. The combination of the fastener pins, the electrochemically disbondable composition, and the shear pins in the slot provide for three methods of securing an insert to the blade so that a damaged insert can be easily replaced.

16 Claims, 2 Drawing Sheets

REPLACEABLE LEADING EDGE INSERT FOR AN IBR

CROSS-REFERENCE TO RELATED APPLICATIONS

This application is related to a co-pending U.S. Regular utility application Ser. No. 11/378,747 filed on Mar. 17, 2006 and entitled AIRFOIL COMPOSITE LEADING EDGE INSERT; U.S. patent application Ser. No. 11/605,857 filed on Nov. 28, 2006 and entitled TURBINE BLADE WITH ATTACHMENT SHEAR INSERTS; and U.S. Ser. No. 11/654,158 filed on Jan. 17, 2007 and entitled AIRFOIL LEADING EDGE INSERT WITH DISBONDABLE COMPOSITION. All of these above identified patent applications are incorporated herein by reference.

BACKGROUND OF THE INVENTION

1. Field of the Invention

This invention relates to a fan blade, and more specifically to a replaceable insert on a integrally bladed rotor disk or blisk.

2. Description of the Related Art Including Information Disclosed Under 37 CFR 1.97 and 1.98

As one skilled in this technology appreciates, the gas turbine power plant typically incorporates fans and compressor blades for imparting compression to intake air (straight jet engines do not incorporate fans) which is then delivered to the combustor where fuel is combusted to add heat thereto. Hence, this engine working medium is accelerated before being delivered to the turbine which is mechanically connected to the fan/compressor so that the energy extracted from the engine working medium is converted to power the compressor fan/blades to pressurize the intake air and develop propulsive thrust. The fan blade, which essentially is a compressor blade that is typically mounted upstream of the smaller compressor blades, not only serve to pressurize the intake air, it also develops thrust which is added to overall thrust developed by the engine.

As will become apparent from the description to follow, this invention is particularly efficacious for use in an Integrally Bladed Rotor (IBR) of a gas turbine engine, but also has potential use for airfoils that are utilized in non-IBR configuration. The following discussion relates to the IBR configuration.

Modern day fan blades are generally highly sophisticated so as to achieve high pressure ratios across the stage(s) of fan blades which require swept airfoils and contoured blade shaping to attain necessary superior aerodynamics. The backward sweep of the airfoil leading edge typically serves to reduce shock losses and noise generation while the forward sweep is typically incorporated to enhance the aerodynamics of the airfoil.

In addition to the aerodynamics of the airfoil, be it a fan, a compressor or a turbine blade, a concern of the designer and the engine user is the stress concentration of the blade. During operation, the blades and disk rotate and generate substantial centrifugal forces which are carried by the disk. The designer of the IBR must assure that the steady tensile stress and the alternating stress are maintained within their limits throughout the entire IBR configuration for the entire operating envelope of the power plant. What is not in the control of the designer is localized stress concentration that is occasioned by blade damage due to foreign object damage (FOD). Ingested objects, such as grit or sand from the runways, small birds, ice, or other objects can damage the blade or the engine.

During normal operation, FOD may cause chips or nicks in the blades and most commonly in the leading edge. Obviously, because the IBR is a complicated hardware requiring special materials and expensive manufacturing, it is extremely costly to discard an IBR whenever the blade becomes damaged. Since the IBR is an integral unit of the blades and disks, obviously the removal of the blade for repair purposes is non-existing.

While the teachings disclosed in U.S. Pat. No. 5,725,354 granted to Wadia et al on Mar. 10, 1998 entitled FORWARD SWEPT FAN BLADE, relates to a separate leading edge, the present invention differs not only in the construction thereof, but also the design philosophy. To best understand the difference between these two concepts, one should appreciate the teachings in the Wadia et al reference, supra, where the swept portion of an IBR fan blade is made from a separate composite piece that fits into the portion of the airfoil of the fan blade so as to attain the forward sweep. As is true in all fan blades, the airflow over the blades induces vibration in the airfoil and creates alternating stresses. These stresses, i.e., steady tensile stress and alternating stresses are not uniform and vary over the length, width and thickness of the blade. This situation is acerbated by indications on (damages to) the airfoil such as nicks, chips, cracks and the like caused by sand, dirt, bird ingestion, or other objects. These cause stress concentration. The problem is more complicated when the leading edge is significantly swept forward. While this innovation provides aerodynamic benefits, it changes the center of gravity of the blade and hence, complicates the stress design of the airfoil. Hence, the purpose of the teachings of the Wadia et al '354 patent, supra, is to provide a design configuration that improves the stress problem by reducing the steady stress along the leading edge of the airfoil which would otherwise occur from effecting forward sweep.

Of significance, the present invention differs from the Wadia et al '354 patent and other known prior art designs by 1) providing a removable leading edge that can be fabricated from the same or different materials, and 2) designing the leading edge as an independent load carrying member where it includes an airfoil portion and an attachment portion (root), such that the loads on the airfoil are transmitted from the airfoil through the root of the leading edge into the disk. Hence, the disk, whether an IBR or non-IBR fans, must be designed to accommodate the root of the leading edge for attachment thereto.

In addition, foreign object damage (or, FOD) is a significant and continuing problem for both military and commercial aviation engines. FOD is estimated by Boeing to cost the aerospace industry some $4 billion per year and estimates the cost to repair a FOD-damaged engine to easily exceed $1 million. The cost of repairing FOD damage to an engine can easily exceed 20% of the engine's original purchase price.

Repair of IBRs that are now common to modern military aircraft engines present a real concern for maintenance in the event of FOD. The lower aspect ratios of modern fan blades (resulting in blades that resemble heavy meat cleavers rather than long carving knives) should provide greater tolerance to FOD and bird strike. However, if IBR blades are damaged, their repair may be more difficult because the blades cannot be replaced on the flight line (airports, aircraft carriers, air bases, and other places of operation). Although 'on-wing blending' (filing a fan blade's damaged leading edge, within tolerable limits, without removing the engine from the aircraft) may be an acceptable repair technique for some minor dents, more serious damage will likely result in the engine having to be removed, and entire IBRs will need to be replaced or replacement blades welded on.

Another prior art reference, U.S. Pat. No. 4,342,542 issued to Tan et al on Aug. 3, 1982 and entitled MOVING BLADE OF STEAM TURBINE discloses a rotor blade with a leading edge with an anti-erosion plate attached by welding that extends from the blade tip to almost the platform. One problem with using this type of replaceable leading edge for a modern IBR is that the surface area on which the bond is formed between the replaceable leading edge insert and the blade is small resulting in higher stresses occurring on the bond. Also, the bond is required to secure the insert to the blade against all the directions including the radial direction which opposes the centrifugal force developed due to rotation. Another problem is the insert is not easy to replace, especially in the field of usage (e.g., at a machine shop).

U.S. Pat. No. 5,785,498 issued to Quinn et al on Jul. 28, 1998 and entitled COMPOSITE FANBLADE TRAILING EDGE REINFORCEMENT discloses a fan blade with a replaceable insert for a top portion of the trailing edge of the blade, where in the embodiment of FIG. 3 of this patent shows a single mechanical fastener (a nut and bolt) that further secures the insert to the blade along with a bonding substance. One problem with using this type of replaceable leading edge for a modern IBR is that the insert does not cover the leading edge for overcoming the FOD problem and the insert does not extend along most of the edge of the blade, leaving a large portion of the edge exposed to damage on a non-replaceable surface.

An object of the present invention is to provide for an airfoil of a compressor or fan for a gas turbine engine of the IBR type a detachable leading edge that can be easily removed and replaced.

Another object of the present invention is to provide for an IBR leading edge that is secured to a blade by a disbondable composition that will not be released during a lightening strike.

Another object of the present invention is to provide for an IBR leading edge that that is secured to a blade by a disbondable composition that will act to hold the insert against radial displacement with respect to the blade during operation.

Another object of the present invention is to provide for an IBR leading edge that is secured to the blade along the entire length to prevent unzipping of the insert from the blade from FOD.

Another object of the present invention is to provide for a blade retainer ring that will balance the rotor disk as well as retain a shear pin within slots.

BRIEF SUMMARY OF THE INVENTION

The airfoil replaceable leading edge (ARLE) insert of the present invention will act as a sacrificial part that can be easily replaced. The ARLE insert of the present invention, when combined with a titanium airfoil substrate blade, will provide significant advantages over conventional titanium first stage compressor fan blades. The ARLE can be a metallic such as titanium or fiber reinforced composite material such as carbon fiber. The ARLE insert of the present invention will provide a sacrificial airfoil leading edge that can be field refurbished (repaired) at the Organizational Maintenance Level on the aircraft for conventional and integrally bladed rotor designs, improve fan performance, improve survivability, reduce weight, and provide mechanical damping to IBR rotors.

The airfoil replaceable leading edge (ARLE) insert of the present invention is a removable leading edge using an electrochemically disbondable composition (disclosed in U.S. Pat. No. 6,620,308 B2 issued to Gilbert on Sep. 16, 2003, the patent being incorporated herein by reference) and a row of rivets that secure the insert to the blade for redundancy. The insert is secured to the blade platform by two flexible shear pins that fit within slots formed between the blade root and the insert root and act to secure the insert against radial displacement. A row of rivet pins or screws hold the aft end of the insert to the blade to prevent unzipping of the insert from the blade due to FOD. The ARLE insert is joined to the titanium alloy airfoil via a scarf joint and the electrochemically disbondable composition to ensure a high-strength bond between the composite and the metal. The metal substrate airfoil can be either hollow or solid and will be aerodynamically viable in the event the leading edge insert becomes separated from the substrate. The material for a composite ARLE is frangible so that in the case of FOD on the leading edge, the separated composite piece will not damage the engine downstream. The metallic or titanium ARLE would not be as frangible as the composite ARLE.

To prevent a lightening strike on the bladed rotor disk from releasing the electrochemically disbondable composition, the rivet pins function as an electrical conductor between the insert and the blade to provide an electrical short circuit and bypass the electrochemically disbondable composition. The pin also provides a rigid support for the insert against the centrifugal force due to rotation that would cause the insert to fly off of the blade if the bond strength was not sufficient. When an insert is to be removed from the blade, the conducting pin is removed so that the electrical current applied will pass through the electrochemically disbondable composition to release the insert.

The present invention provides a leading edge insert that is easily replaced in the field of usage, and in which the insert is secured to the blade by three separate bonds, the bonds being an electrochemically disbondable composition, a shear pin in the blade root portion, and a row of pins.

DETAILED DESCRIPTION OF THE INVENTION

Figure 1:
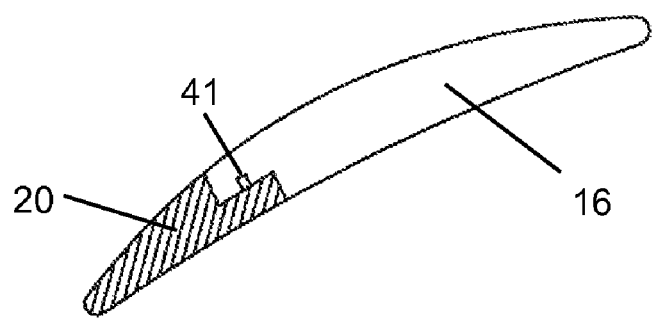
FIG. 1 shows a top view of a blade with a replaceable leading edge insert of the present invention.

The present invention is an airfoil replaceable leading edge (ARLE) member (insert) that is attached to a blade of a rotor disk used in a compressor or fan of a gas turbine engine. The bladed rotor disk can be an integrally bladed rotor disk (IBR) or a rotor disk with individual mounted blades inserted in slots formed in the rotor disk. The invention is shown in FIG. 1 in which a IBR 12 includes a blade 16 extending from the rotor portion of the disk, a platform 18 to form an inner shroud segment of the blade, and an airfoil leading edge insert 20 secured to the leading edge of the blade 16.

The insert 20 is secured to the blade 16 by an electrically disbondable composition 28 disclosed in U.S. Pat. No. 6,620,308 issued to Gilbert on Sep. 16, 2003, which is incorporated by reference herein. The insert 20 is removed from the blade by applying a direct current of 50 volts to the two parts to loosen the bonding composition 28. When the current is removed, the electrically bonding composition 28 will harden and secure the two parts together.

A row of rigid pins 41 passes through holes formed in both the insert 20 and the blade 16 and provides a mechanical means to secure the insert 20 against a centrifugal force due to rotation of the IBR. The rigid pins 41 are each electrically conductive to allow for current from a lightening strike on the IBR to bypass the electrically disbondable material 28. With the IBR in operation, and the insert 20 bonded to the blade 16 and insulated thereto, a lightening strike on the IBR or insert 20 would cause a current to flow through the disbondable composition 28, releasing the bonds and causing the insert to fly off of the IBR. Thus, the pins 41 provides for both an electrical path between the insert 20 and the blade 16 to allow for the current to flow, bypassing the disbondable composition 28, and also provides radial support to the insert against centrifugal force due to rotation of the IBR that would cause the insert 20 to break away from the bond if the force was strong enough. The removable pins 41 can be rivets or screws that do not penetrate to the opposite side of the blade and are easily removed so that the insert 21 can be easily removed from the blade 16 for replacement. The pins 41 can be threaded, spring biased into locking position, or any other well known fastening method that is relatively easy to remove. The bonding surfaces of the blade and the insert are preferably of a scarf joint shape such that a larger bonding surface is formed. A scarf joint is considered to be a joint that extends from (in the case of the present invention) from the suction side surface along a flat surface on the leading edge portion for about ⅔rds of the way to the pressure side surface, and then along the chordwise direction of the blade until a smooth transition is formed between the insert and the blade on the pressure side surface of the airfoil as seen in FIG. 1. It is preferable that the scarf joint extends along the pressure side of the blade because this is the side of the highest pressure acting on the insert. This would tend to push the scarf joint against the blade body and aid in holding the insert to the blade. However, a scarf joint with the extended portion lying on the suction side of the blade would also operate according to the concept of the present invention.

Figure 2:
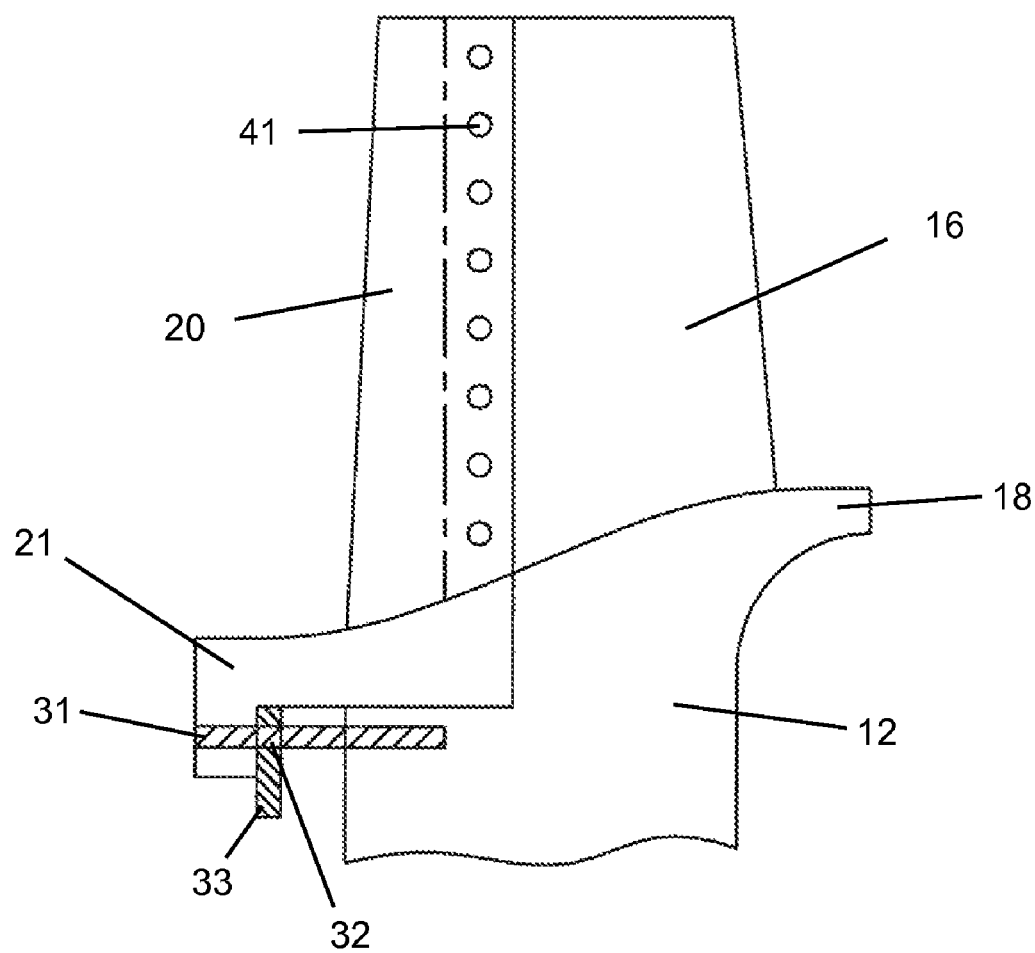
FIG. 2 shows a side view of the platform portion and lower blade and insert portion and the shear pins of the present invention.
Figure 4:
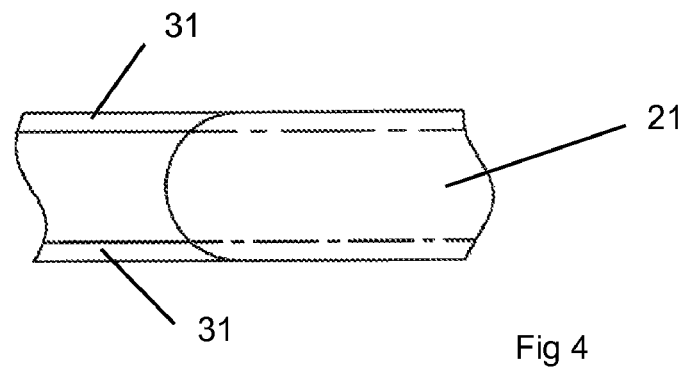
FIG. 4 shows a top view of the shear pins and pin grooves of the present invention.
Figure 5:
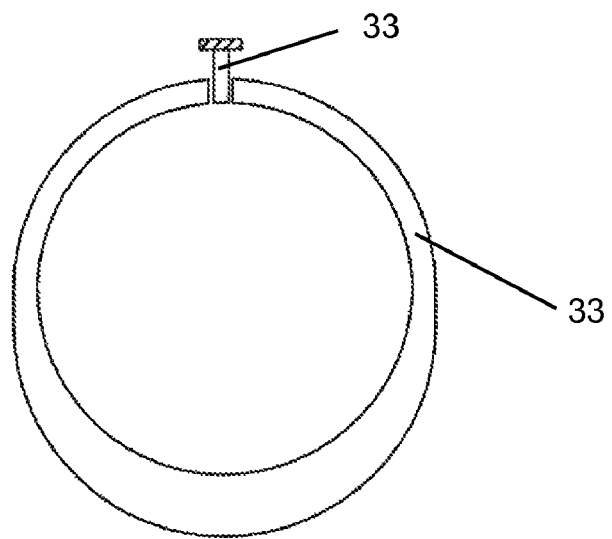
FIG. 5 shows a cross sectional view of a balance and retaining ring used in the present invention.

FIG. 2 shows a side view of the platform and the insert secured to the platform of the blade by two shear pins 31. The insert 20 includes a platform 21 with shear pin grooves formed on the sides to accept a shear pin. The blade platform includes a slot in which the insert platform 21 fits, and the platform slot also includes two shear pin slots to accept a shear pin. With the insert platform 21 placed in the blade platform slot, the shear pin slots are opposed to each other such that a slot is formed in which a shear pin can be inserted to secure the insert to the blade against radial displacement. The slots can be straight or curved in order to follow the curvature of the airfoil at the junction between the airfoil and the platform. An annular groove 32 is located underneath the forward or upstream platform of the blade and receives a balance and retaining ring 33 that functions to retain the shear pins 31 within the slots to secure the blade against radial displacement as well as provide balance to the rotor disk. The balance ring 33 is shown in FIG. 4 and includes an open end so the ring can expand. The balance ring has a varying diameter with a larger diameter portion opposed to a smaller diameter portion. To balance a rotor disk, the balance ring is positioned with the larger diameter portion at a proper location around the 360 degree arc to best balance the rotor disk. A stationary wedge portion fits within the open ends of the balance ring 33 to prevent rotation of the ring 33 after it is properly positioned and secured to the rotor disk. The balance ring 33 also functions to prevent the shear pins 31 used to secure the leading edge insert 20 to the blade and platform. Centrifugal forces occurring during rotation of the rotor disk will force the balance and retaining ring 33 upward into the annular groove 32 to prevent it from falling out and the shear pins 31 from coming out.

Figure 3:
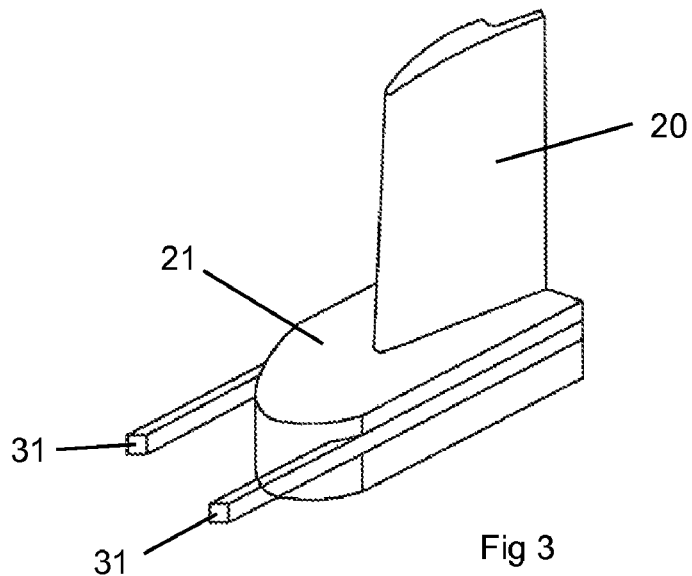
FIG. 3 shows a schematic view of the replaceable leading edge insert and shear pin arrangement of the present invention.

FIG. 3 shows a schematic view of the leading edge insert and insert platform having the slots and shear pins located within the slots. The shear pins 31 are forced into the slots so that a tight fit is formed to prevent the shear pins from loosening and coming out from the slots during operation of the IBR. FIG. 4 shows a top view of the insert platform with the shear pins located within the slots. In this embodiment, the slots are straight. However, the slots could have a slight curvature in order to follow the curvature of the airfoil at the junction of the platform.

In the IBR of the present invention, the blade 16 is made of titanium and the composite insert 20 is constructed from either bismalemide (BMI, a type of thermoset polyimide that cures by an additional reaction to avoid formation of volatiles) resin combined with IM7 carbon fibers, or BMI combined with structural fiberglass fibers (S glass), or a toughened epoxy combined with carbon fiber, titanium or combinations of the above. The metal blade 16 can be solid or hollow. The composite insert 20 is joined to the blade 16 by a scarf joint or other configuration and an electrically disbondable material 28 to ensure a high strength bond between the composite insert 20 and the metal blade 16. The electrically disbondable material 28 is placed between the titanium blade 16 and the insert 20. A nickel plating 26 is placed over the insert 20 to provide energy absorption to the blade assembly. In the embodiment of the composite leading edge, a thin layer of a nickel or other electrical conductive metal is placed between the insert 20 and the electrically disbondable material 28. Electric insulation junctions (the fastening pins 41) are formed at the aft end of the composite insert 20 and along the insert end from the bottom of the blade to the blade tip to provide an electrical insulation between the insert 20 and the blade 16 for when the DC current is applied to set or release the disbondable composition 28. Examples of materials for are rubber, plastic, epoxy, or other materials that would provide electrical insulation and survive the conditions on a compressor blade. The insert is removed from the slot when the current is applied to loosen the disbondable material 28 and remove the insert 20.

The leading edge of the blade 16 includes the insert 20 secured to it with the disbondable material 28, and the nickel plating 26 formed over the insert 20. The removable rigid pins 41 are shown passing through the insert and into the blade 16, and acts to secure the insert against radial forces that tend to pull the insert out from the blade during rotation of the IBR. As described above, the rigid pins 41 are also electrically conductive to provide for a short circuit between the insert and the blade 16 to bypass the disbondable material 28. The insulating material 30 runs along the aft end of the insert 20 to provide insulation between the insert 20 and the blade 16.

The metal substrate 16 and the composite material 20 secured together by the bonding material. The DC current (the releasing current) is applied such that the metal blade substrate is the anode, while the insert material is the cathode. Using this particular arrangement will result in the electrically disbondable composition to remain on the insert when the pieces have been separated, leaving the titanium blade free from any epoxy residue.

Using the present invention in a jet engine will allow for easy replacement of a damaged leading edge insert of the blisk. A damaged leading edge insert 20 can be removed by applying the DC releasing current across the disbondable material 28 to release the bond. The shear pins are removed and the row of rigid pins or rivets is removed so that the insert can be removed from the blade. A new leading edge insert 20 can then be placed on the blade, pressed into place, the insulating material applied to the edge along the insert 20 between the blade. The shear pins are inserted, and then the row of pins or rivets are secured to the blade to tighten the scarf joint and hold the insert to the blade. The ARLE can be made from a fiber reinforced composite material such as carbon fiber, or from titanium or a high strength aluminum material or alloy of these materials. The blade or blisk on which the ARLE is bonded to can also be made from one of these materials. A titanium ARLE can be bonded to a blade made from a carbon fiber reinforced composite material. Or, an ARLE made from a carbon fiber reinforced composite material can be bonded to a blade made from titanium.

We claim:

1. A replaceable leading edge insert for use on a rotor blade of an IBR, the insert comprising:
   a leading edge airfoil portion;
   a root portion with the airfoil portion extending therefrom;
   a scarf joint on an aft side of the airfoil portion;
   a row of holes extending along the scarf joint in a substantially radial direction of the blade to provide for electrically conductive fasteners to secure the insert to the blade; and,
   an electrically disbondable material on the scarf joint for securing the insert to a rotor blade.

2. The replaceable leading edge insert of claim 1, and further comprising:
   the root portion of the insert includes two shear pin retainer slots to provide for two shear pins to secure the root portion within a rotor disk slot against radial displacement of the insert.

3. The replaceable leading edge insert of claim 2, and further comprising:
   the root portion of the insert includes an annular groove to receive an annular retaining ring to prevent the shear pins from the shear pin slots.

4. The replaceable leading edge insert of claim 1, and further comprising:
   the root portion of the insert forms a flow path surface for the fluid passing around the blade.

5. The replaceable leading edge insert of claim 1, and further comprising:
   the row of holes is of such spacing to prevent unzipping of the insert form the blade.

6. The replaceable leading edge insert of claim 1, and further comprising:
   the leading edge insert extends to a blade tip of the blade.

7. An integrally bladed rotor having a plurality of blades extending from the rotor disk with each blade having a forward edge formed to receive a replaceable leading edge insert, the integrally bladed rotor comprising:
   the replaceable leading edge insert having a scarf joint on the aft edge of the insert with a row of holes to secure the insert to the blade;
   a plurality of electrically conductive fastener means inserted into the holes to secure the insert to the blade; and,
   an electrically disbondable material on the scarf joint for securing the insert to a rotor blade.

8. The integrally bladed rotor of claim 7, and further comprising:
   the row of holes is spaced such that unzipping of the insert from the blade is prevented.

9. The integrally bladed rotor of claim 7, and further comprising:
   at least one of the plurality of fastener means also provides for an electrical conduction path between the insert and the blade to prevent the electrically disbondable composition from releasing due to a lightening strike to the integrally bladed rotor.

10. The integrally bladed rotor of claim 7, and further comprising:
    the replaceable leading edge insert extends to the tip of the blade.

11. The integrally bladed rotor of claim 7, and further comprising:
    the rotor includes a slot for each blade to receive an insert root portion;
    the rotor slot having two shear pin slots;
    the replaceable insert having a root portion sized to fit within the slot in the rotor, each root portion having two shear pin slots positioned to form shear pin slots when the insert is placed within the rotor slot; and,
    two shear pins secured within the slots to radially secure the replaceable insert to the rotor.

12. The integrally bladed rotor of claim 11, and further comprising:
    the shear pin slots have a curvature that substantially follows the curvature of the airfoil at the junction to the blade platform.

13. The integrally bladed rotor of claim 11, and further comprising:
    the two shear pin slots each have an opening on the forward side of the rotor and a closed end on the aft side, and each shear pin slot slopes upward from the forward end to the aft end of the rotor.

14. The integrally bladed rotor of claim 11, and further comprising:
    an annular groove formed underneath the platform of the insert; and,
    an annular retaining ring secured within the annular groove to retain the shear pins within the shear pin slots.

15. The integrally bladed rotor of claim 14, and further comprising:
    the retaining ring is also a balancing ring to provide balance to the rotor disk.

16. The integrally bladed rotor of claim 7, and further comprising: at least one of the plurality of fastener means also provides for an electrical conduction path between the insert and the blade to prevent the electrically disbondable composition from releasing due to a lighting strike to the integrally bladed rotor.

* * * * *